Dec. 10, 1935.    T. CREW    2,024,093
BRAKE
Filed Aug. 12, 1931    2 Sheets-Sheet 1

Thomas Crew,
INVENTOR
BY Victor J. Evans
and Co.   ATTORNEYS

Dec. 10, 1935.  T. CREW  2,024,093
BRAKE
Filed Aug. 12, 1931  2 Sheets-Sheet 2

Thomas Crew, INVENTOR
BY Victor J. Evans and Co. ATTORNEYS

Patented Dec. 10, 1935

2,024,093

UNITED STATES PATENT OFFICE 2,024,093

BRAKE

Thomas Crew, Oklahoma City, Okla., assignor to Crew Hi-Speed Brake, a corporation Application August 12, 1931, Serial No. 556,679

1 Claim. (Cl. 188—72)

This invention relates to brakes of motor vehicles and has for the primary object, the provision of a device which will efficiently operate both on the front and rear wheels of a vehicle and is capable of providing maximum braking action and will not drag or retard the wheels when not applied and will reduce to a minimum the accumulation of foreign matter within the brakes.

Another object of this invention is the provision of a drum and brake shoe both of conical shape, and the brake shoe so mounted and operated that, when brought into engagement with the drum, it will contact evenly therewith at all points so as to provide maximum braking action not obtainable by the conventional type of expanding or contracting brakes.

With these and other objects in view, this invention consists in certain novel features of construction, combination and arrangement of parts to be hereinafter more fully described and claimed.

Figure 1:
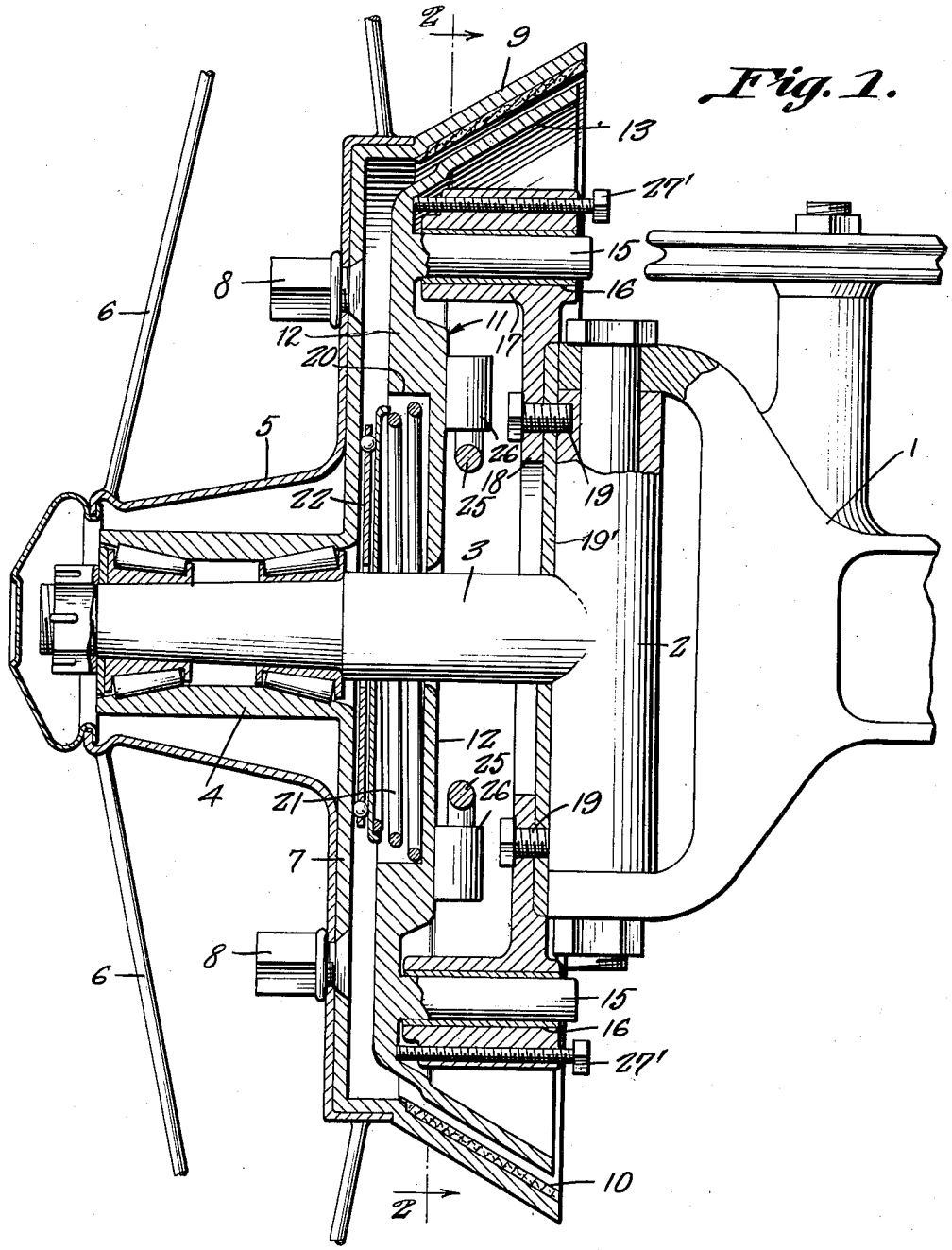

For a complete understanding of my invention, reference is to be had to the following description and accompanying drawings, in which Figure 1 is a fragmentary sectional view illustrating a vehicle brake constructed in accordance with my invention.

Figure 2:
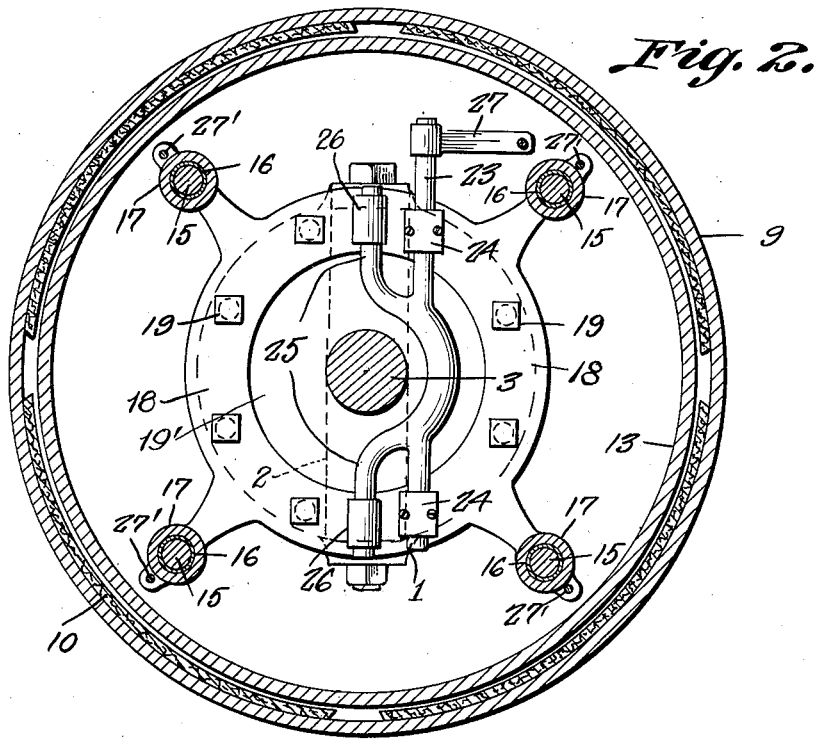

Figure 2 is a sectional view taken on the line 2—2 of Figure 1.

Referring in detail to the drawings, the numeral 1 indicates an axle of the steering type having the usual stub axle 2 which includes the spindle 3 on which the wheel bearing 4 is mounted. The wheel bearing 4 supports the hub 5 of a demountable wheel 6. The wheel bearing 4 includes the annular plate 7 to which the hub 5 is detachably secured by the fastener 8. The foregoing description relates to a well known type of axle and wheel construction to which my invention is applied.

A conical shaped brake drum 9 is formed integral with the annular plate or flange 7 and has secured to its inner face brake lining 10 preferably arranged in a plurality of sections as shown in Figure 2.

A brake shoe 11 includes an annular member 12 surrounding the spindle 3 and is provided with a conical shaped element 13 arranged adjacent the brake lining. The member 12 is provided with spaced pins 15 slidably received in bushings 16 mounted in bearings 17 carried by an annular plate 18 detachably secured to a plate 19' by stud bolts or like fasteners 19. Certain of the stud bolts are threaded to the steering knuckle 2 after passing through the plate 19'. One face of the member 12 is provided with a recess 20 to receive an expansion spring 21 which bears against a thrust bearing 22 positioned against the annular plate or flange 7 of the wheel bearing which also forms an integral part of the brake drum. The action of the spring 21 is to normally urge the brake element 13 away from the brake drum 9 and the lining thereof so as to prevent the brake element from dragging when not applied.

An operating rod 23 is journalled in bearings 24 carried by the plate or member 18 and has formed integral therewith curved and oppositely disposed arms 25 on which the rollers 26 are journalled. The rollers 26 bear against the brake shoe 11 as shown in Figure 1. An arm 27 is secured to one end of the opening rod and is adapted to be connected to a brake rigging so that when the latter is actuated the brake shoe will be moved toward and in engagement with the brake drum against the influence of the spring 21 to retard or stop the rotation of the wheel. A brake shoe constructed in accordance with the foregoing and mounted in the manner described when brought into engagement with the brake lining will contact evenly at all points and thus provide a brake capable to giving maximum braking action.

The bearings 17 have threaded thereto adjusting rods 27' adapted to limit the movement of the brake shoe 11 away from the brake drum under the influence of the spring, and said adjusting rods are provided with squared heads to receive a wrench or similar tool whereby the brake shoe may be adjusted toward and from the drum, as desired.

While I have shown and described the preferred embodiment of my invention, it will be understood that minor changes in construction, combination and arrangement of parts may be made without departing from the spirit and scope of my invention, as claimed.

Having thus described my invention, what I claim is:

A brake comprising a drum carried by a wheel and having a conical-shaped portion, a lining fixed to the inner face of the conical-shaped portion of the drum, an annular member arranged within the drum and having an axle of a wheel passing therethrough and provided with a recess to form a spring seat, a conical-shaped element formed on said annular member to engage and disengage with the lining, a fixed annular plate arranged adjacent the annular member, bearings formed on said annular plate, pins formed on said annular member and slidable in the bearings to guide the movement of the annular member towards and from the drum, a coil spring housed in the recess and having one end engaging the seat, a thrust bearing engaging the other end of the spring and the drum whereby said annular member is normally urged to disengage the conical-shaped element thereof from the lining, an operating medium connected to the plate and to the annular member for moving the latter against the action of the spring and to engage the conical-shaped element with the lining, and adjusting rods threaded to the bearings to be engaged by the annular member to limit the movement of the latter under the influence of the spring.

THOMAS CREW.